US012576809B2

(12) United States Patent
Seiler

(10) Patent No.: US 12,576,809 B2
(45) Date of Patent: Mar. 17, 2026

(54) METHOD FOR PROVIDING A REFUGE SPACE

(71) Applicant: MERCEDES-BENZ GROUP AG, Stuttgart (DE)

(72) Inventor: Christian Seiler, Fellbach-Schmiden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 333 days.

(21) Appl. No.: 18/037,608

(22) PCT Filed: Oct. 22, 2021

(86) PCT No.: PCT/EP2021/079412
§ 371 (c)(1),
(2) Date: May 18, 2023

(87) PCT Pub. No.: WO2022/106152
PCT Pub. Date: May 27, 2022

(65) Prior Publication Data
US 2023/0415701 A1     Dec. 28, 2023

(30) Foreign Application Priority Data

Nov. 19, 2020     (DE) ..................... 10 2020 007 073.6

(51) Int. Cl.
*B60R 25/20*          (2013.01)
*G06Q 10/02*          (2012.01)
(Continued)

(52) U.S. Cl.
CPC ......... *B60R 25/2018* (2013.01); *G06Q 10/02* (2013.01); *G06Q 50/40* (2024.01);
(Continued)

(58) Field of Classification Search
CPC ....... B60R 25/2018; G07C 9/27; G06Q 50/40
(Continued)

(56) References Cited

U.S. PATENT DOCUMENTS 11,527,101 B1 * 12/2022 Wisniewski ....... G06V 40/1365
2011/0030310 A1   2/2011 Moore
(Continued)

FOREIGN PATENT DOCUMENTS

CN       205541346 U     8/2016
CN       109548408 A     3/2019
(Continued)

OTHER PUBLICATIONS

International Search Report and Written Opinion mailed Feb. 9, 2022 in related/corresponding International Application No. PCT/EP2021/079412.
(Continued)

*Primary Examiner* — Allyson N Trail
(74) *Attorney, Agent, or Firm* — PATENT PORTFOLIO BUILDERS PLLC

(57) ABSTRACT

A method for providing a refuge space in an object for a person seeking shelter involving triggering a refuge request via an application on a mobile terminal. A communication unit in the object receives the refuge request via wireless communication. The refuge request is saved in a database system and is anonymously checked based on the digital identity of the mobile terminal. The checking comprises a search in an access authorization system. After a successful positive checking, access to the refuge space is released and the object is switched to a refuge mode. The checking and the release are documented in the database system.

14 Claims, 1 Drawing Sheet

(51) Int. Cl.
   *G06Q 50/40*           (2024.01)
   *G07C 9/00*           (2020.01)
   *G07C 9/27*           (2020.01)
(52) U.S. Cl.
   CPC ........... *G07C 9/00571* (2013.01); *G07C 9/27*
      (2020.01); *B60R 2325/108* (2013.01); *B60R*
      *2325/205* (2013.01); *G06Q 2220/00* (2013.01)
(58) Field of Classification Search
   USPC .......................................................... 235/382
   See application file for complete search history.

(56)          References Cited

U.S. PATENT DOCUMENTS

| | | | | |
|---|---|---|---|---|
| 2011/0060480 | A1* | 3/2011 | Mottla | ............... G07C 9/00571 |
| | | | | 701/2 |
| 2015/0324332 | A1* | 11/2015 | Perret | ..................... G06F 16/50 |
| | | | | 715/234 |
| 2017/0098292 | A1 | 4/2017 | Odejerte, Jr. et al. | |
| 2017/0213163 | A1* | 7/2017 | Cheung | ................ G06Q 20/383 |
| 2021/0153015 | A1* | 5/2021 | Roy | ...................... H04W 4/025 |
| 2022/0146415 | A1* | 5/2022 | Putkaradze | ........ G01N 33/0001 |
| 2022/0383435 | A1* | 12/2022 | Pratt | ...................... G06Q 10/02 |
| 2022/0398677 | A1* | 12/2022 | Moton, Jr. | ....... G06Q 10/06312 |
| 2023/0247018 | A1* | 8/2023 | Dutt | .................... H04L 63/0861 |
| | | | | 713/153 |
| 2023/0321554 | A1* | 10/2023 | D'Avanzo | .............. A63G 31/00 |
| | | | | 472/61 |
| 2024/0031373 | A1* | 1/2024 | Gupta | ................... H04L 63/102 |

FOREIGN PATENT DOCUMENTS

| | | | |
|---|---|---|---|
| DE | 102017219802 | A1 | 5/2019 |
| DE | 102018010027 | A1 | 6/2020 |
| DE | 102020005704 | A1 | 11/2020 |
| JP | 2014041507 | A | 3/2014 |
| KR | 200384695 | Y1 | 5/2005 |

OTHER PUBLICATIONS

Office Action created Nov. 2, 2021 in related/corresponding DE Application No. 10 2020 007 073.6.
Office Action dated May 30, 2025 in related/corresponding CN Application No. 202180077144.5.

* cited by examiner

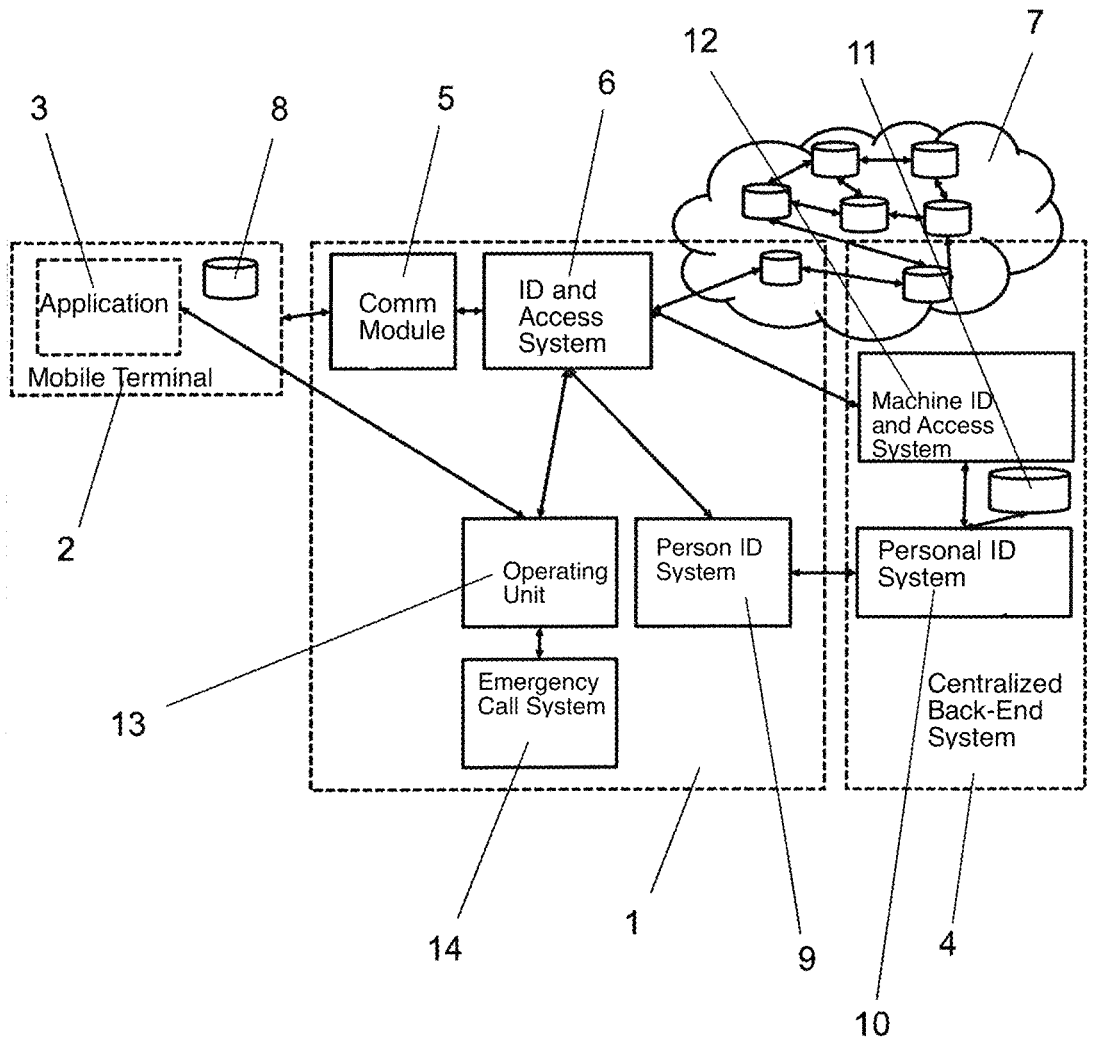

METHOD FOR PROVIDING A REFUGE SPACE

BACKGROUND AND SUMMARY OF THE INVENTION

Exemplary embodiments of the invention relate to a method for providing a refuge space in an object for a person seeking shelter.

In emergency situations, refuge spaces can offer protection and shelter for passers-by. Such refuge spaces can, on one hand, be formed in buildings. They can, on the other hand, also be provided in mobile units or objects. These can, for example, be parked vehicles, which offer protection and shelter for passers-by in emergency situations. If a person in distress, who is also referred to as a person seeking shelter or a shelter-seeking person, is near a vehicle, they, however, typically do not have access to this vehicle, unless it is their own vehicle. An unknown vehicle can thus not offer them protection.

DE 10 2018 010 027 A1 discloses that an identification of a person by means of data communication and an external user interface is, in principle, possible. However, this procedure necessitates a so-called "on-boarding," so a registration of the corresponding person, typically on a centralized server, as well as producing a link between this specific person and a physical object, like, for example, a vehicle, a building or similar. An access to the object, for example the authorization to fully use a vehicle, to enter a building, or similar, is only then possible by means of these properties saved for the respective link.

The method is therefore ideal for the use of a vehicle or of a building, for example by a plurality of people, the number of whom is, however, limited, and typically is not subject to too rapid a change. For the scenario described at the start, such a method is, however, largely unsuitable, because a large number of people would have to register with a large number of servers and/or vehicles, in order to gain access to a specific vehicle. The fact that this vehicle or one of several vehicles that can be realized with a manageable effort, with which a person is registered, is right nearby if the person ends up in an emergency situation would, however, be pure coincidence. Thus, the method can not be used in order to make objects, and here in particular movable objects like vehicles, available as a refuge space or panic room.

Such a method for providing a refuge space, which functions simply and efficiently for a very large number of objects, would, however, be desirable with regard to safety and in particular the feeling of safety of people.

Exemplary embodiments of the present invention are therefore directed to such a method for providing a refuge space in an object for a person seeking shelter, which simply and efficiently enables quick access to a large number of objects for people in distress.

The method according to the invention for providing a refuge space in an object for a person seeking shelter provides that this method triggers a refuge request via an application on a mobile terminal, like, for example, a smartphone. A communication unit in the object receives this refuge request via wireless communication, for example via Bluetooth, Bluetooth Low Energy, WLAN or NFC. It is then, on the part of the object, saved in a database system for logging and documentation and is checked based on the digital identity of the mobile terminal. The checking thereby comprises a search in a centralized access authorization database or to a decentralized identity system. If the checking is positive, then the access to the refuge space is released, so, for example, the doors of a vehicle or of a building entrance are unlocked and the object is switched to a refuge mode. Both the checking and also the release are documented in the database system.

Based on the principles underpinning the above-mentioned patent application DE 10 2018 010 027 A1, a possibility has thus been created for the person seeking shelter of having very quick access to a corresponding object in an emergency with a minimal "on-boarding" effort, which object is then correspondingly suited for the use as a refuge space or panic room via its refuge mode.

A one-off provision of the digital identity of the mobile terminal used is enough, so, for example, of the smartphone in a corresponding database, in order to then get access to all objects which are equipped with such a refuge method and system. As an alternative to such a one-off registration in a centralized access authorization database, the identity of the person seeking shelter could be handled in a decentralized manner via a so-called "self-sovereign identity" approach, such that a server system coupled with the object requests the identity of the person seeking shelter from this decentralized identity system in the event of a refuge request. A targeted "on-boarding" of the objects involved onto the proprietary identity management systems of the administration would thus no longer be at all necessary.

The access to a refuge space can thus be granted exceedingly simply, quickly, and efficiently in an emergency by means of the method according to the invention, and by means of a corresponding documentation of the process in the database system, an unauthorized usage, as well as an actual emergency can be documented and the clarification added, so that the basic danger of an improper usage can be largely prevented.

According to a very advantageous development of the method according to the invention, a decentralized system based on distributed ledger technology can be used as a database system or, according to the above-described very convenient embodiment of the method, via a decentralized identity system. By means of this use of the distributed ledger technology, which is in principle also known from the prior art mentioned at the start for similar uses, the logging and saving of the processes can thus be carried out in a tamper-proof manner in different nodes in a blockchain, so that a very safe logging and documentation is possible, which can almost not be changed and therefore enjoys a high level of confidence and once again further minimizes the possible danger of a fraud.

A further exceedingly convenient embodiment of the method according to the invention can provide that, after closing released access openings, like, for example, doors, these are automatically locked, so that the refuge space forms a safe shelter. It is thereby also provided that if the refuge space is being actively used, no renewed release of the latter occurs. The necessary safety is thus ensured, so that no other person can release the area again via a use of the corresponding application on their part, so that, if applicable, people could enter the area who had endangered or could endanger the person seeking shelter who previously fled there.

A further exceedingly convenient embodiment of the method according to the invention further provides that the application and/or the mobile terminal on which this application is installed is secured via an access restriction. Such a securing of the application or of the whole mobile terminal provided with the application can be useful and necessary in order to prevent a fraud being committed by, for example, gaining access to a refuge space via a lost or stolen mobile terminal, in order to inflict damage there at the expense of the owner of the stolen mobile terminal. Different technologies known in themselves from the field of smartphones are thereby suited as an access restriction, for example biometric access systems by means of facial recognition, iris recognition, fingerprint recognition, or similar. Alternatively, personal identification numbers (PIN), passwords or similar would also be conceivable here.

A really crucial aspect and thus a very especially important and exceptionally advantageous embodiment of the method according to the invention further provides that, in the refuge mode of the object, all available sensors of the object are activated and their collected data is logged. Corresponding sensors can in this case, for example, be cameras and/or microphones. Depending on the configuration of the object and of the refuge space, all events that occurred in the context of the emergency situation can thus be documented, on one hand in order to ensure that the refuge space has only been used corresponding to the valid regulations, and, on the other hand, in order to correspondingly document the emergency situation and, if necessary, to be able to work on identification tactics. Depending on the type of the object, other sensors can also be activated along with cameras, microphones and similar. If the object is, for example, a vehicle, a detection of the surroundings via different environment sensors as well as a detection of the interior can correspondingly be activated in order to document the emergency situation as extensively as possible. Preferably, this can occur in a centralized server of an organization that manages the refuge space.

A further very convenient embodiment of the method according to the invention also provides that, in the refuge mode, an operating unit in the refuge space or an indirect operation of the same by means of the application on the mobile terminal located in the refuge space is activated. By means of this direct or indirect operability of the operating unit, safety functions corresponding to this can then be controlled according to an exceedingly convenient development, in order to thus give the person seeking shelter situated in the refuge space the possibility of being able to correspondingly act on their needs and/or fears.

The safety functions can, according to a very advantageous embodiment, comprise at least one of the following functions. In particular, these can comprise placing an emergency call. The activation and/or deactivation of interior or exterior lighting can also be useful. A dark mode can thus be set, for example by means of the operating unit or indirectly by means of the application on the mobile terminal, in which it is not recognizable from outside that there is even a person situated in the refuge space. If it seems sensible to the person seeking shelter to switch on the lighting, they can also select a light mode, in particular they can also select a dark mode for the refuge space itself and the brightest possible mode for the surroundings. For the vehicle already mentioned, this could, for example mean that the exterior lighting of the vehicle is maximally activated, in order to illuminate the surroundings and, if applicable, to also improve the collection of sensor data. The interior can simultaneously remain darkened, in order to not make it directly recognizable that a person seeking shelter has sought refuge in here, or where exactly in the vehicle this person is located. Furthermore, visual protection functions can be activated or deactivated if possible, for example blinds can be closed or similar. The initiation of a visual and/or audible alarm, for example of a horn or flashing in the case that the object is a vehicle, would also be conceivable.

Furthermore, an air recirculation control and/or air conditioning can be controlled in order to, for example, suppress the entrance of gases, smoke, or similar into the refuge space and to be able to remain in the latter for as long as possible. Of course, a locking and unlocking of access openings like doors can be controlled as a safety function. With this, rescuers can, for example, be let in, or the doors can be opened in order to also be able to leave the shelter again, after the emergency situation has ended.

As has now already been mentioned several times, it can be provided according to an extremely convenient embodiment of the method according to the invention that the object is designed as a mobile object, in particular as a vehicle. As well as the in principle also conceivable design of the object as a building, this embodiment as a vehicle is especially useful. For example, in many areas of towns, a parked vehicle is almost always nearby, and could thus serve as a refuge space very easily and efficiently. This can, on one hand, relate to private vehicles, however here this assumes the cooperation of a plurality of private people with the system. It can therefore also be useful if vehicles of businesses, carpools, vehicles from the public services fleet, taxis, or similar make themselves available to for system. These are often equipped such that they are already used by different people, which is why there are almost no personal belongings in the vehicle. The danger of a robbery of belongings or similar is thus reduced and the acceptance of the system amongst the owners of these kinds of vehicles is more easily achieved than among private users of vehicles.

In particular in the embodiment of the objects as vehicles, but not exclusively here, it can additionally be provided according to a very convenient embodiment of the method according to the invention that a restricted functionality is made available in the refuge mode. The functionality can correspondingly be restricted, so that only the necessary functions are directly provided. Unnecessary functions can correspondingly be blocked, if the access to the object occurs via a refuge request. The encroachment into undesired areas like, for example, adjoining rooms where a building is the object, or into the glove compartment where a vehicle is the object, can thus correspondingly be blocked, as well as the possibility of driving the vehicle, or similar.

According to a further, very convenient embodiment of the method according to the invention, it can additionally be provided that the object emits a signal after receiving a refuge request. Such a signal can, for example, be a visual or audible signal of the object, in order to show, in the case that a refuge request has been made, that the nearest available object with a refuge space is situated in the corresponding position. It would furthermore be conceivable to only send the signal to the application of the mobile terminal, for example by showing via an arrow and an indication of distance that the next available refuge space is 30 m left of the mobile terminal, in order to thus help the person in distress, but to enable this without a reference to the selected refuge space that is also recognizable by third parties.

Further advantageous embodiments of the method according to the invention arise from the exemplary embodiment, which is described in more detail in the following, with reference to the sole FIGURE.

BRIEF DESCRIPTION OF THE SOLE FIGURE

The sole FIGURE shows a theoretical scenario for explaining the method according to the invention in a possible embodiment.

DETAILED DESCRIPTION

The illustration in the FIGURE thereby shows an object 1. This can be a vehicle, a building, a part of a building, a boat, an aircraft, or similar. The commonality of all usefully useable objects here substantially lies in the fact that they can present a certain sheltering function for one or more people in certain emergency situations. This can, in particular, be a locking of the accesses, but also moving away from the current place, placing an emergency call or similar. The object 1 in the exemplary embodiment shown here can subsequently be, for example, a vehicle 1. A person seeking shelter (not shown here) carries a mobile terminal 2, for example a smartphone 2, with them. On this smartphone 2, the person has installed an application 3 that, in an emergency, gives access to the object 1, so here the vehicle. Via the application 3, the identity of the owner of the smartphone 2 has been established in an on-boarding process, and their identity is known in a centralized backend system 4. The application itself 3, or the smartphone 2, has an access restriction, for example a PIN protection and/or security via biometric features or similar. The identity of the smartphone owner can therefore not be misused by means of theft. The object 1, so here the refuge vehicle, which makes a refuge space available to the owner of the smartphone 2 in the emergency must be correspondingly configured to support a refuge mode in such a situation. If the person with the smartphone 2 now approaches the vehicle 1 and if it is clearly signaled by the application 3 that this is an emergency, then the following substantially occurs:

The application 3 communicates with a communication module 5 of the vehicle 1 via a wireless communication connection like, for example, Bluetooth, Bluetooth Low Energy, WLAN or NFC.

Via a machine identification and access system 6, the refuge request and thus, ultimately, the desire to obtain access to a refuge space is registered and saved anonymously in a distributed database system 7. In this decentralized database system 7, which is based on distributed ledger technology, all further relevant events are also saved for later traceability, however without any personally identifying data, so that the protection of the personal data is here guaranteed in every case.

Meanwhile, a request is sent to a centralized person identification system 10 with the digital identity, from a secure memory 8 of the smartphone 2, via a person identification system 9. This searches a centralized access authorization database 11 inside the centralized backend system 4. If the digital identity is recognized there and authorized to gain an emergency access to the vehicle 1, then this is reported back to the local machine identification and access system 6 via a centralized machine identification and access system 12 of the centralized backend system 4. This event is also correspondingly documented in the database system 7.

After this positive checking has been carried out, access openings, for example the doors of the vehicle 1, are released, so that the person seeking shelter can use the vehicle 1 as a refuge space with their smartphone 2. A refuge mode or panic room mode is activated inside the vehicle 1 and simply comprises a delimited functionality of the vehicle 1, which is optimized for corresponding emergency situations. Depending on the implementation of the concept, the functionality can thereby vary, optionally also taking different boundary parameters into consideration, so that, for example, different functionalities are available in different places, at different times and/or depending on the ambient brightness. For example, such a refuge mode could comprise the following functionalities:

As soon as the vehicle doors are closed, these are automatically locked.

An access from outside into the vehicle 1 by a further refuge request is, in this state of active use as a refuge space, then no longer possible.

An access by means of legitimate access like, for example, of an authorized vehicle key or similar can, in some implementations, also be made impossible. It would also be conceivable to make these functions controllable for the person situated in the refuge space via an infotainment system, as an operating unit 13 controllable directly, or indirectly via the application 3 of the smartphone 2. Therefore, for example, a locking against authorized access can be switched on or off by a corresponding activation in the operating unit 13.

As an example, an activation could also be controlled via such an operating unit 13 regarding the lighting. Therefore, a "dark" and a "light" mode could, for example, be predetermined as switching variants. The "dark" mode would then lead to the interior of the vehicle 1 being darkened to the outside so that, for example, in the dark, it is not visible from outside that there is even a person situated in the interior of the vehicle. The "light" mode could be implemented in such a manner that all exterior lights turn on, in order to be able to maximally illuminate the surroundings of the vehicle.

All the cameras, microphones, and sensors of the vehicle 1 are activated in order to simply enable a later reconstruction of events. The data captured by the available sensors, including the cameras and microphones of the vehicle, both in the surroundings and also in the interior of the vehicle, enable a continuous monitoring, which is preferably documented by saving the recorded data.

From the interior of the vehicle 1, an emergency call system 14 can be activated via an activation of the operating unit 13, which can, for example, be realized as part of an infotainment system. Here, a direct emergency call can be placed, for example via the so-called eCall that is required in Europe. The individual placing of an emergency call, for example alerting the police or fire brigade, is obviously also conceivable.

Depending on the equipment of the vehicle 1, the air conditioning can be set to a special air recirculation mode, in order to ensure a self-sufficient air supply in the interior of the vehicle 1 that is serving as a refuge space for as long as possible.

Further, in the refuge mode, visual and/or audible alarms can be initiated by means of activations in the infotainment system, for example the sounding of an alarm system, the flashing of the vehicle 1 lights, the initiation of the horn, or similar.

As already mentioned, all relevant events and, if necessary, values recorded by the sensor system of the vehicle 1 are thereby correspondingly recorded and documented. The data from the sensors, like, for example, the cameras and microphones, is preferably automatically saved in short time intervals, for this. It can also be transmitted to the centralized backend system 4 at short time intervals. However, the condition for this is a functioning internet connection. If this does not exist, the corresponding data can also be temporarily saved in the vehicle and/or the application of the smartphone, in order to correspondingly send this to the centralized backend system 4 at the earliest possible point in time.

By means of this method, any object 1 like, for example, a vehicle, can thus be used as a life raft or refuge space for people in danger, even if these people would not normally have access to the object 1. The relevant events are documented in a tamper-proof manner by means of blockchain-based solutions, whereby a fraud is clear and traceable in every case. This significantly reduces the danger of a possible fraud. In particular for parked vehicles, which are not private in nature, like, for example, taxis, buses, delivery vans, minibuses, vehicles of distributor and courier services, for mobile social services or ambulances etc., this can be a valuable additional benefit for society and social cooperation in communities, in this mode. They then offer a safe refuge space if there are no other help options or people to provide help nearby.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for providing a refuge space in an object for a person seeking shelter, the method comprising:
   signaling, by an application on a mobile terminal, that there is an emergency; establishing, by the application on the mobile terminal responsive to the signaling that there is the emergency and as the mobile terminal approaches the object, a wireless communication connection with a communication unit in the object;
   transmitting, via the application on the mobile terminal, a refuge request over the wireless communication connection;
   receiving, by a communication unit in the object the refuge request via the wireless communication connection;
   saving the refuge request in a database system;
   anonymously checking the refuge request based on a digital identity of the mobile terminal, wherein the anonymously checking comprises a search in an access authorization system; and
   releasing, after a successful anonymously checking of the refuge request, access to the refuge space;
   switching, after the successful anonymously checking of the refuge request, the object to a refuge mode; and
   documenting the checking and the release in the database system.

2. The method of claim 1, wherein the access authorization system comprises a central access authorization database, and wherein the anonymously checking the refuge request involves querying the central access authorization database for access authorization, or
querying a decentralized identification system regarding an identity of the person seeking protection.

3. The method of claim 2, wherein
the database system is a decentralized system based on distributed ledger technology, or
the decentralized identification system is based on distributed ledger technology.

4. The method of claim 1, the method further comprising:
closing released access openings to the refuge space, wherein after closing the released access openings the released access openings are automatically locked, wherein if the refuge space is being actively used, no renewed release of the released access openings occurs.

5. The method of claim 1, wherein the application or the mobile terminal is secured via at least one access restriction.

6. The method of claim 1, wherein in the refuge mode
an operating unit in the refuge space is activated, or
an indirect operation of the operating unit by the application on the mobile terminal located in the refuge space is activated.

7. The method of claim 6, further comprising:
controlling safety function via the operating unit.

8. The method of claim 7, wherein the safety functions comprise at least one of the following functions:
   placing an emergency call;
   activating or deactivating interior or exterior lighting;
   locking or unlocking access openings;
   initiating visual or audible alarm functions;
   configuring and activating air conditioning;
   deactivating the air conditioning;
   activating or deactivating an air recirculation control; and
   activating or deactivating visual protection functions.

9. The method of claim 1, wherein the object is a vehicle.

10. The method of claim 1, wherein the object has a set of functionality and the object makes a restricted subset of the set of functionality available in the refuge mode.

11. The method of claim 1, wherein the object emits at least one signal after receiving a refuge request.

12. The method of claim 1, wherein the object is a vehicle and the vehicle is configured to support the refuge mode.

13. The method of claim 1, wherein the access authorization system comprises a central access authorization database, and wherein the anonymously checking the refuge request involves querying a decentralized identification system regarding an identity of the person seeking protection, wherein the decentralized identification system uses distributed ledger technology.

14. A method for providing a refuge space in an object for a person seeking shelter, the method comprising:
   triggering, via an application on a mobile terminal, a refuge request;
   receiving, by a communication unit in the object the refuge request via wireless communication;
   saving the refuge request in a database system;
   anonymously checking the refuge request based on a digital identity of the mobile terminal, wherein the anonymously checking comprises a search in an access authorization system; and
   releasing, after a successful anonymously checking of the refuge request, access to the refuge space;
   switching, after the successful anonymously checking of the refuge request, the object to a refuge mode; and
   documenting the checking and the release in the database system, wherein in the refuge mode, all available sensors of the object are activated and data collected from the all available sensors is logged.

\* \* \* \* \*